United States Patent [19]

Weghaupt

[11] 4,155,019
[45] May 15, 1979

[54] COUPLING ASSEMBLY FOR MUTUALLY COUPLING A GENERATOR ROTOR HAVING A SUPERCONDUCTIVE EXCITER WINDING AND A SHAFT CARRYING EXCITER CURRENT LEADS

[75] Inventor: Erich Weghaupt, Mülheim-Ruhr, Fed. Rep. of Germany

[73] Assignee: Kraftwerk Union Aktiengesellschaft, Mülheim-Ruhr, Fed. Rep. of Germany

[21] Appl. No.: 644,632

[22] Filed: Dec. 29, 1975

Related U.S. Application Data

[63] Continuation of Ser. No. 480,396, Jun. 18, 1974, abandoned.

[30] Foreign Application Priority Data

Jun. 27, 1973 [DE] Fed. Rep. of Germany ....... 2332700

[51] Int. Cl.² .............................................. H02K 1/32
[52] U.S. Cl. ....................................... 310/61; 310/71; 310/165
[58] Field of Search ..................... 310/10, 40, 52, 54, 310/58, 165, 59, 68 D, 261, 264, 265, 61, 71, 112, 114; 62/505; 339/9

[56] References Cited

U.S. PATENT DOCUMENTS

| 3,359,438 | 12/1967 | Hylen | 310/52 |
|---|---|---|---|
| 3,363,122 | 1/1968 | Hoover | 310/52 |
| 3,471,726 | 10/1969 | Burnier | 310/54 |
| 3,471,729 | 10/1969 | Burnier | 310/54 |
| 3,626,717 | 12/1971 | Lorch | 310/54 |
| 3,644,766 | 2/1972 | Hughes | 310/40 |
| 3,673,444 | 6/1972 | Kawabe | 310/10 |
| 3,745,389 | 7/1973 | Lorch | 310/52 |
| 3,809,932 | 5/1974 | Sugawara | 310/10 |

FOREIGN PATENT DOCUMENTS 1269236  5/1968  Fed. Rep. of Germany ............. 310/58

Primary Examiner—R. Skudy
Attorney, Agent, or Firm—Herbert L. Lerner

[57] ABSTRACT

An assembly is provided for mutually coupling a generator rotor which has a superconductive exciter winding, and a shaft, which carries exciter current leads. Disconnectible electrical, hydraulic and mechanical connections are located in the vicinity of the coupling assembly and extend in axial direction of the rotor and the shaft. The coupling assembly includes a pair of coupling halves in the interior of which a hollow chamber, which is gas-tightly sealed against the outer atmosphere, is defined.

The disconnectible connections are located in the hollow chamber and include axially movable and releasable telescoping socket-like plug members for a coolant circulatory system and for the exciter current leads. The telescoping socket-like plug members are displaceable in axial direction thereof relative to one another upon insertion thereof in and disconnection thereof from one another and upon thermal expansion thereof. A coaxial channel is formed in the shaft, and a leak suction chamber surrounds the shaft at an end distant from the coupling halves, the coaxial channel connecting the hollow chamber to the leak suction chamber.

5 Claims, 4 Drawing Figures

COUPLING ASSEMBLY FOR MUTUALLY COUPLING A GENERATOR ROTOR HAVING A SUPERCONDUCTIVE EXCITER WINDING AND A SHAFT CARRYING EXCITER CURRENT LEADS

This is a continuation, of application Ser. No. 480,396, filed June 18, 1974, now abandoned.

The invention relates to a coupling assembly for mutually coupling a generator rotor having a superconductive exciter winding and a shaft carrying exciter current leads, disconnectible, electrical, hydraulic and mechanical connections being provided in the vicinity of the coupling assembly.

The marked technical difficulties of the disconnectible connections of an exciter shaft and a generator rotor of the foregoing type have become well-known from water cooled turbogenerator rotors, such as, for example, in German Published Prosecuted Application DAS 1 269 236 and German Published Non-Prosecuted Application DOS 1 563 089. In this connection, the exciter current connections, the connection of the coolant water supply and return lines, as well as the mechanical shaft connections must be effected simultaneously by special constructive measures.

In the case of turbogenerator rotors with superconductive exciter windings, wherein a low-cooled coolant with especially high diffusion capacity and a temperature of about 4° K is used, these difficulties are even greater in such a case, a tight yet simultaneously disconnectible connection of the coolant supply and return channels must be provided as well as additional shielding measures for the thermal flux penetrating inwardly from the outside, and compensation of large axial relative movements of the coolant lines as well as of the exciter current leads at the location of the coupling assembly.

It is accordingly an object of the invention to provide a coupling assembly of the aforementioned type which meets all of the foregoing requirements in a relatively simple manner and yet is absolutely operationally reliable.

With the foregoing and other objects in view, there is provided, in accordance with the invention, an assembly for mutually coupling a generator rotor having a superconductive exciter winding and a shaft carrying exciter current leads, disconnectible electrical, hydraulic and mechanical connections being located in the vicinity of the coupling assembly, comprising a pair of coupling halves defining in the interior thereof a hollow chamber gas-tightly sealed against outer atmosphere, the disconnectible connections being located in the hollow chamber and including releasable plug connections for a coolant circulatory system and for the exciter current leads, a coaxial channel formed in the shaft, and a leak suction chamber surrounding the shaft at the end thereof distant from the coupling halves, the coaxial channel connecting the hollow chamber to the leak suction chamber.

Through this disposition of all sealing and connecting locations in a hollow chamber of the coupling, a relatively simple disconnection of all of the connections that are to be disconnected is possible at the coupling, so that moreover unavoidable coolant leaks at the disconnectible connection locations have no effect upon the operational reliability of the superconductive generator rotor.

In accordance with another feature of the invention, the coolant circulator system comprises coolant channels in the form of coaxial tubes, the coolant channels being mutually connected in the hollow chamber defined by the coupling halves as telescoping plug connections, and including sealing rings interposed between the cooling tubes at the connections for sealing the tubes yet affording axial displacement thereof.

In accordance with a further feature of the invention, evacuated annular channels are located between and separate the coolant tubes so as to thermally insulate the coaxial tubes one from the other.

In accordance with yet another feature of the invention, the exciter current leads comprise hollow conductors extending axially parallel and disposed radially outwardly of the coolant circulatory system, the hollow conductors having connections in vicinity of the coupling halves that have the construction of axially displaceable electrical plug contacts.

In accordance with yet an added feature of the invention, the exciter current leads in the generator rotor are surrounded by a separate coolant tube, and including sealing ring means are sealingly interposed between the plug contact connection of the exciter current leads and the separate coolant tube in vicinity of the coupling halves.

In accordance with an additional feature of the invention, the telescoping plug connections are each formed of plug connection halves respectively located facing the rotor and the shaft, the plug connection halves located facing the rotor being connected vacuum-tightly and axially displaceably with the rotor by an expansion compensating device disposed in the hollow chamber.

In accordance with a concomitant feature of the invention, the rotor is formed with a winding head chamber traversible by coolant, and the hollow conductors are formed with axially extending bores therethrough connecting at one end with the winding head chamber and at the other end with the coaxial channel connecting the hollow chamber to the lead suction chamber.

In accordance with another feature of the invention, throttling means are included in the coolant circulatory system for determining coolant quantity flowing therein.

Other features which are considered as characteristic for the invention are set forth in the appended claims.

Although the invention is illustrated and described herein as embodied in a coupling assembly for mutually coupling a generator rotor having a superconductive exciter winding and a shaft for an exciter or slip ring, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
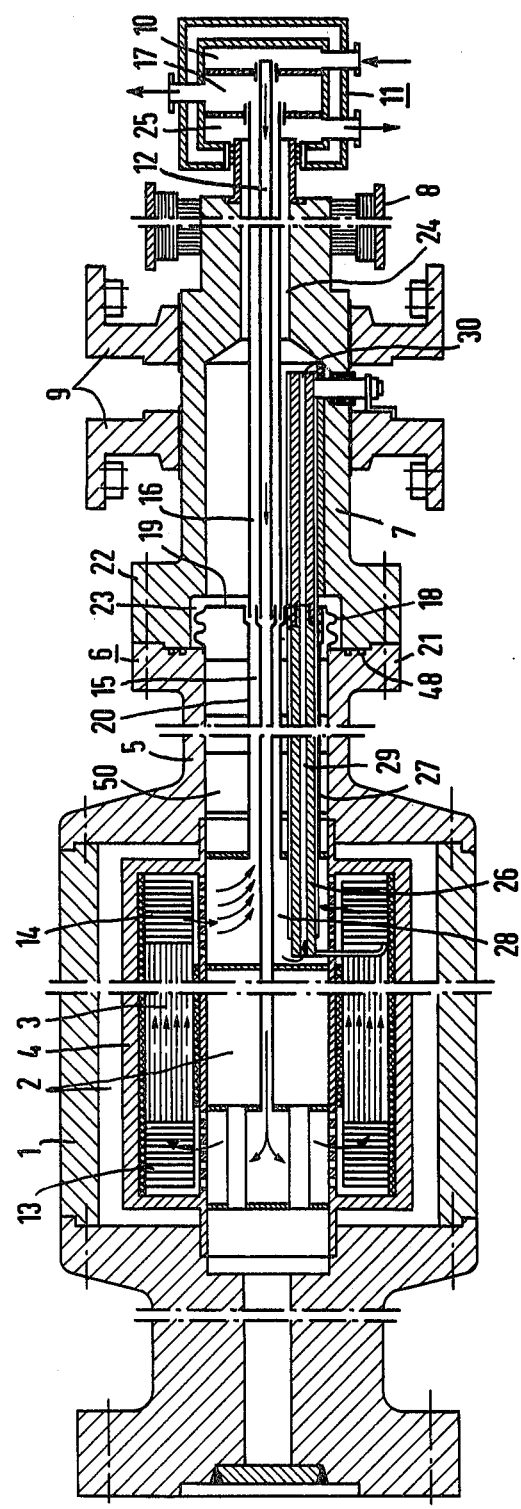
FIG. 1 is a longitudinal sectional view of a rotor and shaft carrying exciter current leads of a generator incorporating the coupling of the invention.
Figure 2:
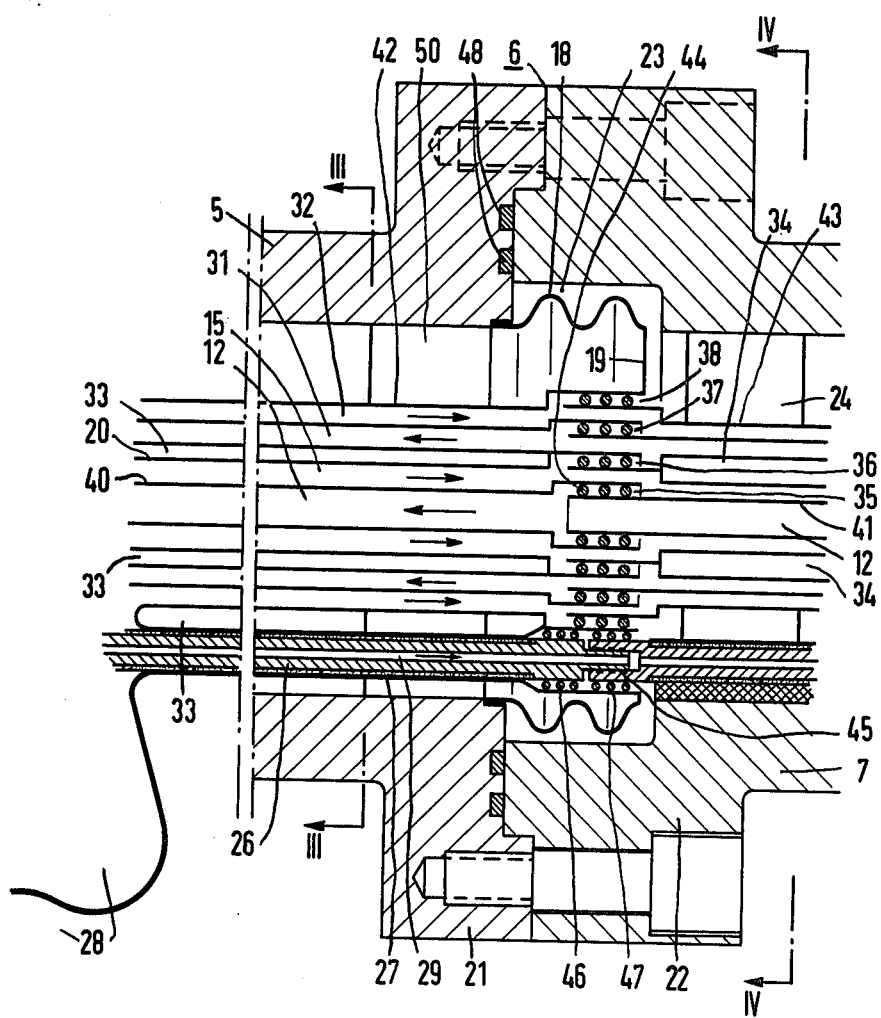
FIG. 2 is an enlarged fragmentary view of FIG. 1 showing the coupling and parts of the surrounding structure.
Figure 3:
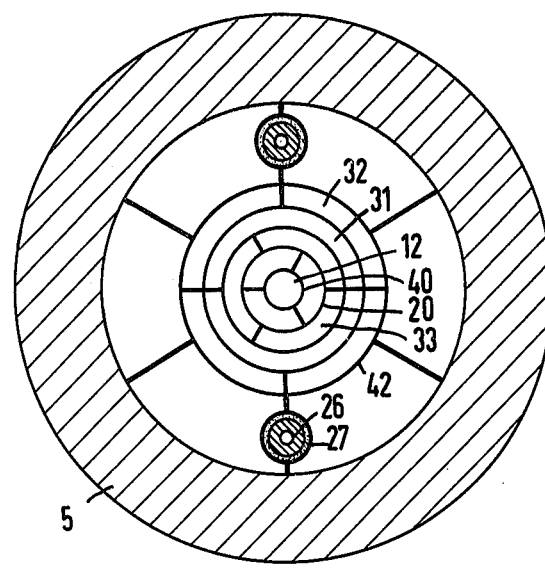
FIG. 3 is a cross-sectional view of FIG. 2 taken along the line III—III in the direction of the arrows showing the rotor shaft.
Figure 4:
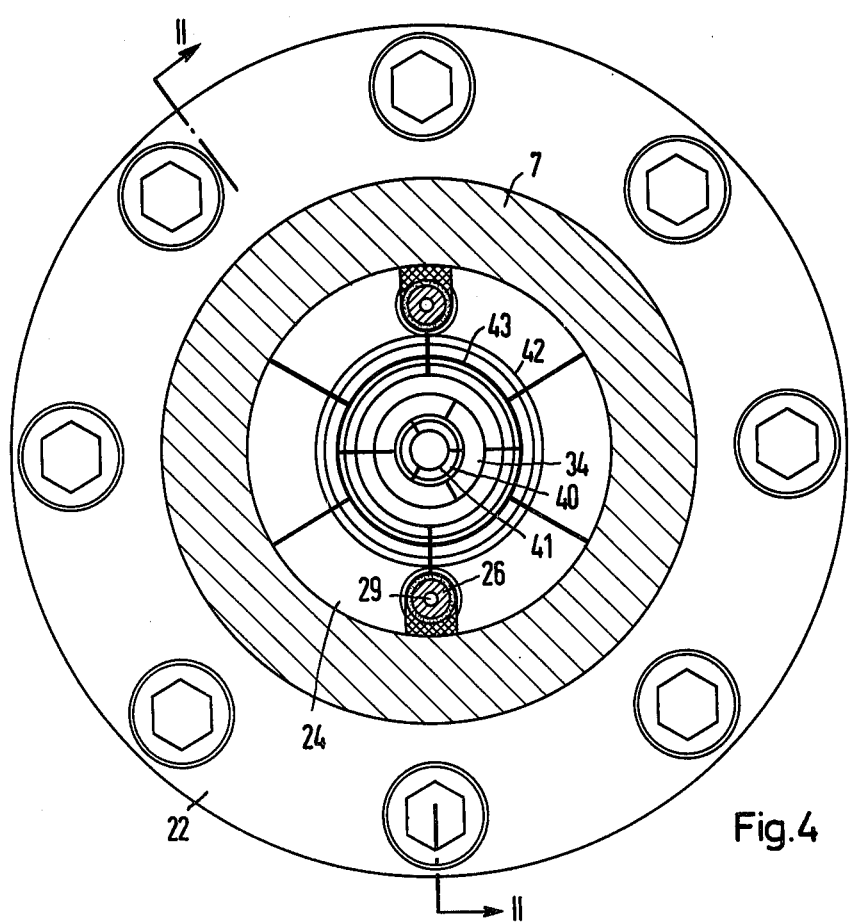
FIG. 4 is a cross-sectional view of FIG. 2 taken along the line IV—IV in the direction of the arrows, showing the shaft carrying exciter current leads.

Referring now to the drawing and first, particularly, to FIG. 1 thereof, there is shown therein a longitudinal sectional view of a rotor shaft 1 and an exciter current lead-carrying shaft 7 of a generator or the like provided with a coolant feed, the upper half of FIG. 1 being shown rotated at an angle of about 45° to the cross-sectional plane of the lower half of FIG. 2, as is represented by the cross section lines II—II in FIG. 4 of the drawing. The rotor 1 of the generator is of drum-shaped construction. The inner space 2 of the drum-rotor 1 is evacuated for better thermal insulation of the hereinafter described contents of the inner space 2. An exciter winding or coil 3 of superconductive material is mounted on the inside of a separate cylinder 4 which is force-lockingly connected to the drum rotor 1 or outer housing. The exciter current lead-carrying shaft 7 is connected by a coupling 6 to the hollow rotor shaft 5 forming part of the drum rotor 1, an exciter armature 8 and diode wheels 9 being carried by the exciter current lead-carrying shaft 7. It is also possible, however, to transmit exciter current through non-illustrated rings. Fluid, low-cooled coolant in the form of liquid helium, for example, flows from an inlet chamber 10 of a coolant terminal or connecting head 11 through a coolant supply channel 12 coinciding with the axis of the exciter current lead-carrying shaft 7 and the rotor shaft 5 to a winding head or coil end 13 of the exciter coil 3 that is located at the side of the chamber 2 facing toward the non-illustrated turbine which, together with the generator, from part of a conventional turboset, and from the coil end 13 travels in parallel branches through individual coil windings and leaves the rotor 1 from a winding head or coil end 14 located at the side of the chamber 2 facing toward the exciter 7 through an annular channel 15 concentric with or coaxial to the coolant supply channel 12. The helium which has become heated travels through a connecting annular channel 16 formed in the exciter current lead-carrying shaft 7 into a coolant outlet chamber 17 of the coolant terminal or connecting head 11 and is conducted from there to a non-illustrated refrigeration machine.

As noted hereinbefore, the hollow spaces 2 of the drum rotor 1 are evacuated, as is also a hollow space 50 which surrounds the coolant channels 12 and 15 in the rotor shaft 5. With the aid of an expansion compensating device or bellows 18 of conventional construction, having an end plate 19 disposed normal to the axis thereof, an outer coolant guide tube 20 for the rotor shaft 5 being inserted therein at the end plate 19, the evacuated spaces 2 are closed vacuum-tightly at the coupling 6, since the expansion compensating device 18 is welded to the coupling half 21 of the rotor 1.

In the coupling half 22 located on the exciter side of the coupling 6, a hollow space 23 is provided which is connected by a coaxial channel 24 to a leak suction chamber 25 in the coolant terminal or connecting head 11.

As described hereinafter in further detail, quantities of coolant oozing out through leaks at the coupling location can thereby be removed by suction reliably.

Exciter current leads 26, of which only the lower one is shown in the sectional view of FIG. 1, are constructed as hollow conductors and conduct exciter current produced or supplied by rotating rectifiers or diodes or a slip ring. These leads 26 are disposed in a guide tube 27 which communicates at one end thereof with a helium chamber 28 of the winding head 14 located at the exciter side, and is connected at the other end thereof to the end plate 19 of the expansion compensator 18. Complete separation of the vacuum chamber 2 of the rotor 1 from the current supply leads 26 is thereby achieved. Helium is delivered from the helium chamber 28 through the bore 29 of the exciter current leads 26 and discharges from the bore 29 at the end 30 thereof located at the exciter side and is conducted through the annular channel 24 into the leak suction chamber 25.

The quantity of helium flowing through the current leads 26 is determined by non-illustrated conventional throttling devices so that an adjustment to room temperature substantially at the current lead end 30 is effected so that the helium is transformed from liquid to gaseous state by heating when flowing through the current leads 26.

In FIG. 2, the coupling region proper is shown in enlarged view. In addition to the coolant circuit in the embodiment of FIG. 1, there is further provided in the modification of FIG. 2, a second coolant circui which serves for example, to cool a cold shield not shown in FIG. 1 but which surrounds the winding 3. As seen in FIG. 2, an inner coolant circuit with forward and return lines 12 and 15 is traversed by helium cooled to about 4.2° K. An outer coolant circuit having a forward line 31 and a return line 32 is at a temperature of about 50° to 70° and serves for cooling the aforementioned cold shield. Since the two coolant circuits are at very different temperatures, they are insulated one from the other by evacuated annular gaps 33 and 24 provided, respectively, in the rotor shaft 5 and in the exciter shaft 7. The connections of the coolant supply and discharge channels in the coupling region 6 proper are formed as mutually telescoping socket-like plug connections 35, 36, 37 and 38. Thus, for example, the tube 40 of the rotor-facing supply channel 12, in the region of the coupling 6, overlaps or telescopes the end of the corresponding line 41 of the supply channel 12 located at the exciter side, and the outermost tube 42 of the coolant return channel 32, the tube 42 being connected to the end plate 19 of the expansion compensator 18, overlaps or telescopes the end of the outer tube 43 in the exciter shaft 7. Sealing of these respectively coaxially overlapping or telescoping plug connections 35 to 38 is effected by interposed O-rings 44 which, in a conventional manner, can also be inserted in grooves suitably formed in one of the plug connection parts. These seals permit both coupling and uncoupling of the coolant supply lines as well as axial expanion thereof. Complete sealing of the vacuum chamber 2 and 50 is effected, as aforedescribed, through the expansion compensator 18; consequently the uncoupling of the exciter shaft 7 has no influence at all upon the sealing of the rotor vacuum chamber 2. Moreover, the expansion compensator 18 assures axial displaceability of the coolant tubes.

The provision of the guide tube 27 for the exciter current supply leads 26, in accordance with the invention, markedly simplifies the coupling construction. The guide tube 27 is connected to the end plate 19 of the expansion compensating device 18 and thereby separates the lead 26 completely from the vacuum chamber. Furthermore, through O-rings 46 and 47, the exciter current lead 26 is sealed in the coupling region against penetration by helium, the O-rings 46 and 47 being inserted in a windened or thickened end of the guide tubes 27 or embedded in suitably provided grooves, and effect a sealing with respect to the exciter current supply leads 26. The disconnecting point of the supply leads 26 is constructed as a plug contact connection 45 in the region of the coupling 6.

The exciter current leads 26 are axially displaceably mounted in the guide tube 27, so as to be able to accommodate thermal expansions of the electrical plug connections 45. The inner seal 46 thus assumes sealing of the rotor winding head chamber 28 against helium, while the outer seals 47 serve for sealing the plug connection 45 against coolant flowing through the axial bore 29 of the lead 26.

Leakage at all movable seals must be taken into consideration; however, in the device of the invention of this application, it has no effect upon the operational reliability of the rotor. All helium leakages occurring in the hollow space 23 of the coupling 6 due to detachable seals 34 to 38 as well as 46 and 47 are removed by the annular channel 24 in the leak suction chamber 25.

The hollow space 23 per se of the coupling 6 is sealed against the outside by additional O-ring seals 48 disposed in both coupling halves 21 and 22. Due to the fact that the flange seals are fixed, no difficulties are encountered with respect to the sealing of the space 23 against the outside.

I claim:

1. Assembly for mutually coupling a generator rotor having a superconductive exciter winding and a shaft carrying exciter current leads, and wherein disconnectible electrical, hydraulic and mechanical connections are located in vicinity of the coupling assembly and extend in axial direction of the rotor and the shaft, the coupling assembly comprising, in combination, a pair of couplng halves defining in the interior thereof a hollow chamber gas-tightly sealed against outer atmosphere, the disconnectible connections being located in said hollow chamber and including releasable plug connection halves, respectively comprising mutually telescoping socket-like plug members for a liquid-coolant circulatory system and for the exciter current leads, said plug connection halves being located, respectively, facing the rotor and the shaft, said telescoping socket-like plug members being displaceable in axial direction thereof relative to one another upon insertion thereof in and disconnection thereof from one another and upon thermal expansion thereof, a coaxial channel formed in the shaft, a leak suction chamber surrounding the shaft at the end thereof distant from said coupling halves, said coaxial channel connecting said hollow chamber to said leak suction chamber, and an expansion compensating device disposed in said hollow chamber and vacuumtightly and axially displaceably connecting to the rotor, the plug connection halves facing the rotor, said expansion compensating device having an end wall, the rotor-facing plug connection halves comprising the respective plug members for the circulatory system and for the exciter current leads and being connected to said end wall of said expansion compensating device.

2. Coupling assembly according to claim 8, wherein the coolant circulatory system comprises coolant channels, in the form of coaxial tubes, the coolant channels being mutually connected at a connecting location by said plug members in said hollow chamber defined by said coupling halves, and including sealing rings interposed between said cooling tubes at said connecting location for sealing said tubes yet affording axial displacement thereof.

3. Coupling assembly according to claim 2 including evacuated annular channels located between and separating said coaxial coolant tubes so as to thermally insulate said coaxial tubes one from the other.

4. Coupling assembly according to claim 1 wherein the exciter current leads comprise hollow conductors extending axially parallel and disposed radially outwardly of the coolant circulatory system, the hollow conductors including said plug members for the exciter current leads.

5. Coupling assembly according to claim 4 wherein the exciter current leads in the generator rotor are surrounded by a separate coolant tube and including sealing ring means sealingly interposed between the plug contact connection of the exciter current leads and said separate coolant tube in vicinity of said coupling halves.

* * * * *